Jan. 12, 1926.

A. E. EVANS 1,569,079

APPARATUS FOR CRACKING OFF AND HANDLING CONTINUOUSLY FORMED SHEET GLASS

Filed March 18, 1925   3 Sheets-Sheet 1

INVENTOR
A. E. Evans

Jan. 12, 1926.  
A. E. EVANS  
1,569,079  
APPARATUS FOR CRACKING OFF AND HANDLING CONTINUOUSLY FORMED SHEET GLASS  
Filed March 18, 1925   3 Sheets-Sheet 2

INVENTOR  
A. E. Evans  
by James E. Bradley  
atty

Jan. 12, 1926.  1,569,079
A. E. EVANS
APPARATUS FOR CRACKING OFF AND HANDLING CONTINUOUSLY FORMED SHEET GLASS
Filed March 18, 1925   3 Sheets-Sheet 3
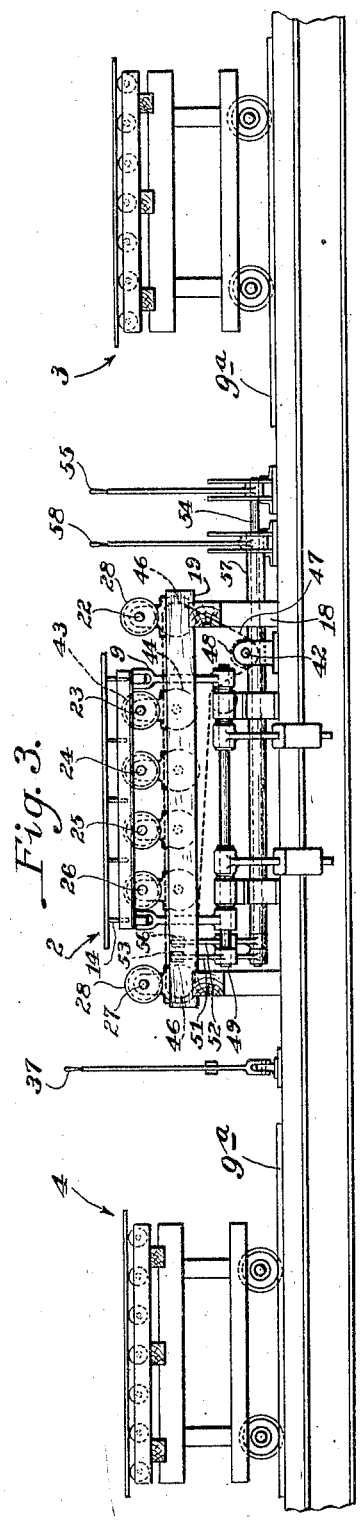
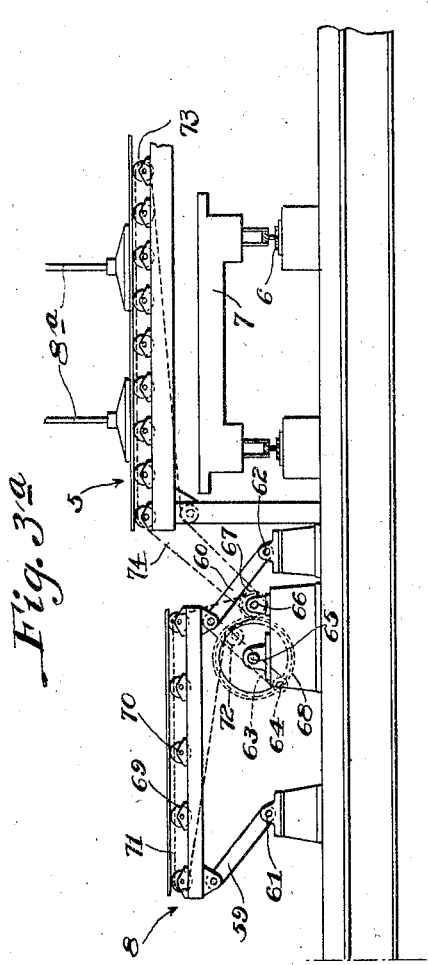
INVENTOR
A. E. Evans
by
James C. Bradley
atty Patented Jan. 12, 1926.

1,569,079

UNITED STATES PATENT OFFICE.

ALBERT E. EVANS, OF PITTSBURGH, PENNSYLVANIA, ASSIGNOR TO PITTSBURGH PLATE GLASS COMPANY, A CORPORATION OF PENNSYLVANIA.

APPARATUS FOR CRACKING OFF AND HANDLING CONTINUOUSLY-FORMED SHEET GLASS.

Application filed March 18, 1925. Serial No. 16,423.

*To all whom it may concern:*

Be it known that I, ALBERT E. EVANS, a citizen of the United States, and a resident of Pittsburgh, in the county of Allegheny and State of Pennsylvania, have made a new and useful invention in Improvements in an Apparatus for Cracking Off and Handling Continuously-Formed Sheet Glass, of which the following is a specification.

Figure 1:
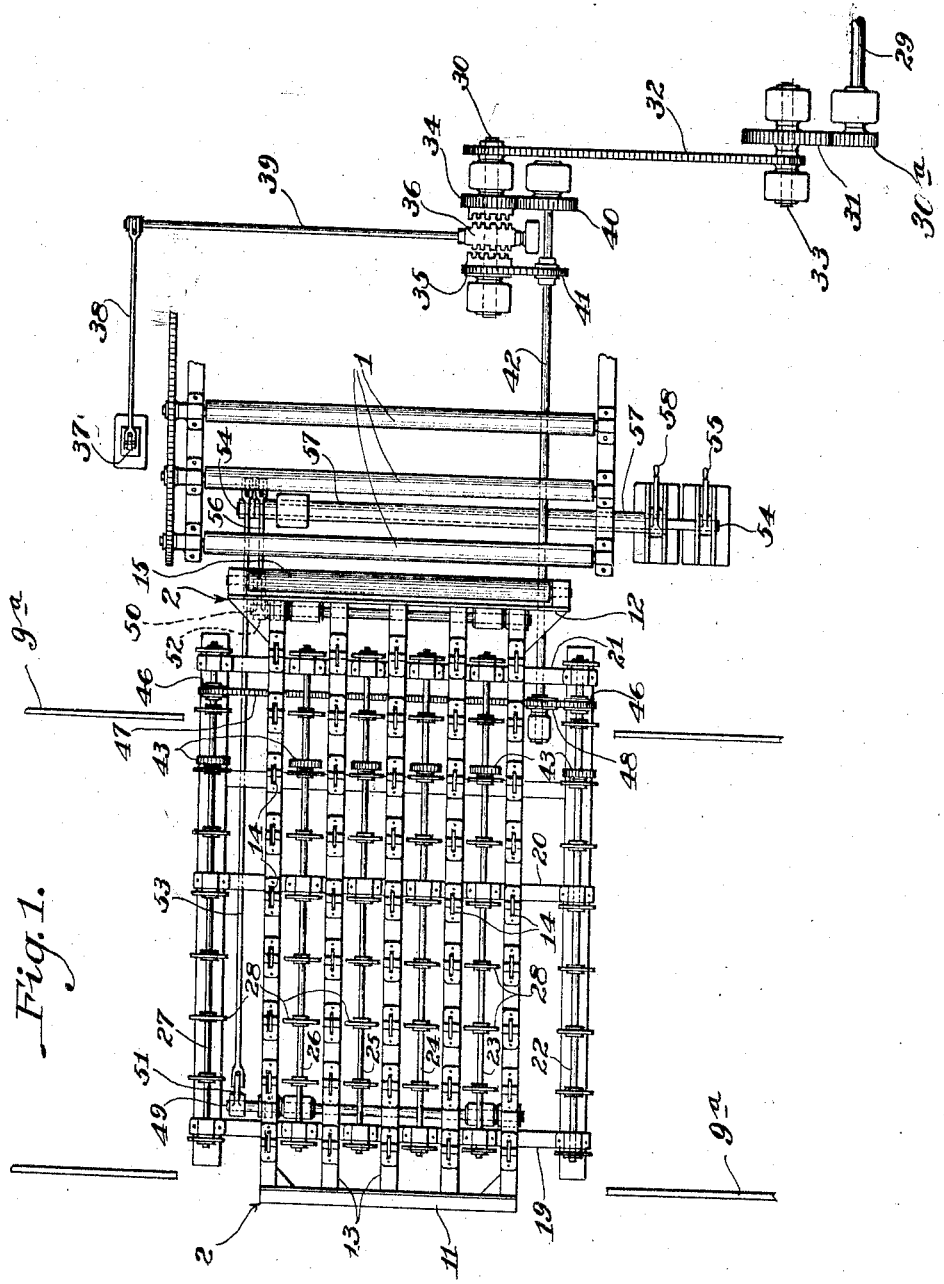
Figure 2:
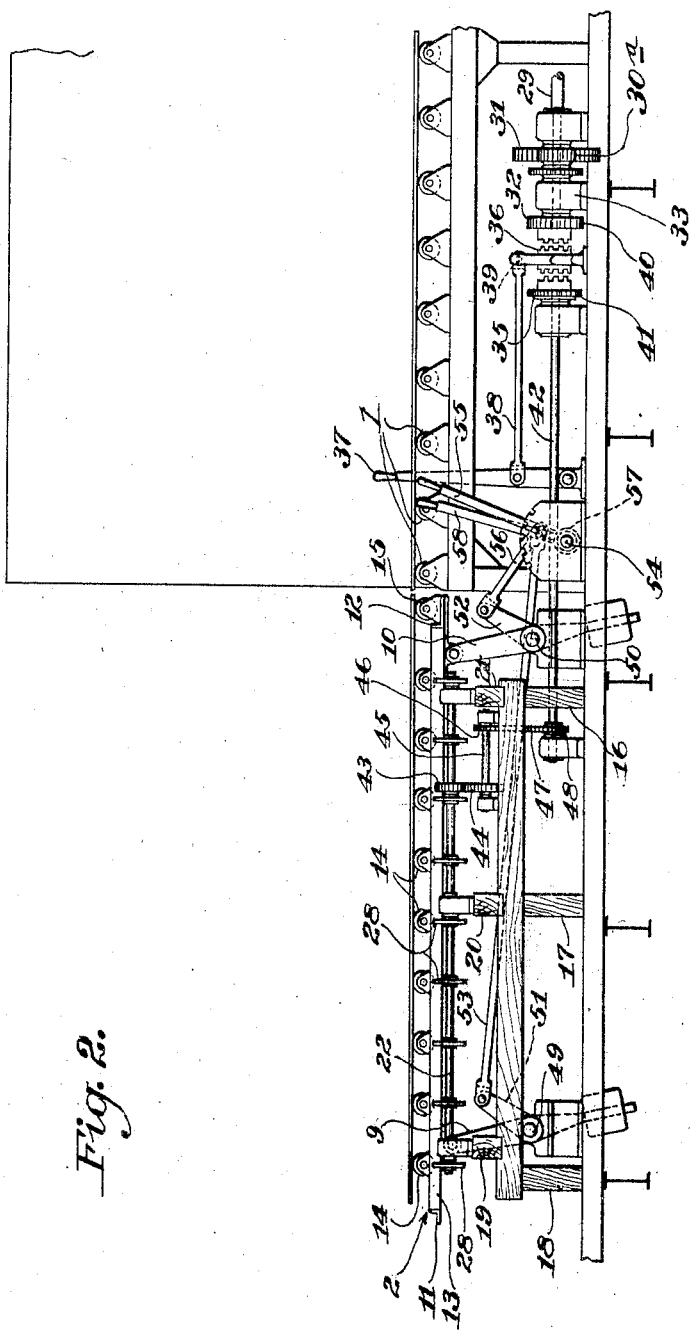

The invention relates to apparatus for cracking off and handling the sections of a continuously formed sheet or ribbon of glass at the outlet end of the leer through which the ribbon or sheet is carried. It has for its principal objects the provision of a convenient arrangement whereby the sheets are cracked off and gotten off of the table without interference with the continuously advancing ribbon, and with little effort on the part of the workmen, and the provision of improved means for shifting the glass sheets or sections to a position adjacent to the track upon which the grinding cars or tables are mounted. One embodiment of the invention is illustrated in the accompanying drawings wherein:

Figure 1 is a partial plan view of the apparatus. Fig. 2 is a partial side elevation. Fig. 3 is an end elevation. And Fig. 3ª is a continuation of the right hand end of Fig. 3.

Referring first to the general arrangement, 1, 1, 1 are three of the rolls constituting a part of the runway at the outlet end of a leer (not shown) in which a continuously generated glass sheet is annealed. 2 is a cracking off table to which the invention largely relates. 3 and 4 are cutting tables on either side of the cracking off table, arranged to receive the sheets from such table. 5 is a receiving table arranged above the level of the cutting tables in order to lie above the cars 7 on the track 6 constituting a part of the grinding system and 8 is a transfer table adapted to receive the sheets from the cutting table 3 and bring them to the level of the receiving table 5, the cutting table 3 being mounted upon a transversely extending track 9ª, so that it may be shifted from a position adjacent the cracking off table 3 to a position adjacent the transfer table 8.

In operation, the sections of the ribbon cracked off upon the table 2 are shifted to the table 3 where they are trimmed, and in some cases, cut into two or more parts, after which the cutting table is shifted across to the transfer table 8, the sheet or section transferred to the table 8, such table moved up so that it is on a level with the table 5, and the section transferred to such table. It is removed from this table to one of the grinding tables located on a track to the right of the track 6 by means of the vacuum frame 8ª. The cutting table 4 comes into play in case of a delay in the cutting or trimming operation on the table 3 or in case it is desired to store a part of the sheets without applying them immediately to the grinding tables. It also comes into play in those cases in which it may be desirable to locate another grinding system on that side of the cracking off table.

The cracking off table is made up of two tables, one of which receives the glass from the rolls 1, 1, 1 and is mounted for movement forwardly and downwardly upon the pairs of links 9 and 10. This table is made up of the transverse angle irons 11 and 12 and the five longitudinal angle irons 13, 13, etc., rigidly secured together and provided with the anti-friction rolls 14, 14, etc. mounted in suitable bearings on axes transverse to the line of movement of the glass ribbon. The tops of these rolls lie in the same plane as the tops of the rollers 1, 1, 1 when this receiving table is in its uppermost position, as indicated in Fig. 2. This table is provided at its rear end with a transverse roll 15, which may be referred to as the cracking off roll, since the cracking off of the sheet occurs when the transverse score line on the continuous ribbon arrives over this roll, the cracking off being caused by swinging the links 9 downwardly a slight amount and imposing a strain upon the glass tending to break it.

The cracking off table 2 also includes a secondary table arranged below the level of the movable table and designed to receive the sheet from the rolls 14 when the movable table is moved still further downward after the cracking off operation. This further downward movement is accomplished by swinging the pairs of links 9 and 10 still further forwardly and downwardly in substantial parallelism after the cracking off operation. This secondary table is supported fixedly upon the wood framework made up of the parts 16, 17 and 18. This table includes the transverse members 19, 20 and 21 and the six longitudinally extending shafts 22, 23, 24, 25, 26 and 27, each carrying a plurality of rolls 28, the planes of rotation of the rolls being at right angles to the line of movement of the ribbon of glass so that after a section is cracked off, and the movable table lowered so that the section is transferred from the rolls 14 to the rolls 28, the section may be moved laterally so as to shift it to the cutting table 3, which is at this time closely adjacent the secondary table. The rolls 14 and 28 are preferably made of hard rubber or fibrous material so as to avoid scratching the glass.

In order to facilitate the movement of the glass section laterally upon the secondary table, the shafts carrying the rollers 28 are preferably driven and the drive is so arranged that the rolls may be rotated in either direction to permit of the transfer of the sheet either to the table 3 or to the table 4. The driving power for the rolls 28 is preferably derived from the leer drive shaft 29, such shaft operating to drive the counter shaft 30 through the intermediary of the spur gears 30ª and 31 and the sprocket chain 32 extending around suitable sprockets on the shafts 33 and 30. The shaft 30 carries loose upon it a gear 34 provided with a clutch and the sprocket wheel 35 provided with a clutch. Intermediate the clutch members is a shiftable clutch member 36 splined to the shaft 30 and operable from the hand lever 37 through the pairs of links 38 and 39, so that driving connection may be made either with the clutch on the sprocket member or with the clutch on the gear member 34. The gear 34 meshes with a gear 40, while the sprocket 35 drives the sprocket 41 by means of a suitable chain, the gear 40 and sprocket 41 being mounted upon a counter shaft 42. By this means, the shaft 42 which controls the direction of rotation of the rollers 28, may be driven either forward or backward depending upon the position of the clutch member 36, the gear 40 serving to rotate the shaft in one direction and the sprocket 41 serving to rotate it in the other direction.

The shafts 22 to 27 each carry spur gears 43, 43, etc. meshing with corresponding spur gears 44, 44, etc., located therebeneath on short counter shafts 45, 45, etc., supported in suitable bearings in the wood framework which carries the shafts 22 to 27. These shafts 45 are also provided with suitable sprocket wheels 46, 46, etc. and these sprockets are driven from a chain 47 passing around the sprocket wheels 46, as indicated in Fig. 3, and also around a sprocket wheel 48 carried by the counter shaft 42. By means of the mechanism as just described, the rolls 28 carried by the shafts 22 to 27 may be rotated in either direction to convey the glass section or sheet laterally to either the cutting table 3 or the cutting table 4, and, when the movable table is in upper position, so that the glass does not engage the rolls 28, the rotation of the parts may be stopped by bringing the clutch 36 to its middle or neutral position, as indicated in Fig. 1.

In order to raise and lower the movable table upon which the glass section or sheet is removed, the pairs of links 9 and 10 are mounted upon rocker shafts 49 and 50, extending transversely beneath the table and carrying at their ends, the rocker arms 51 and 52. The arm 51 is swung by means of a connecting rod 53 engaging a rocker arm on the transverse shaft 54, which shaft is swung by means of the hand lever 55. The arm 52 is swung by means of a short connecting rod 56, pivoted at its rear end to a lever arm upon the tubular shaft 57, such tubular shaft surrounding the transverse shaft 54. This tubular shaft is rotated by means of a second hand lever 58.

When the glass arrives at the position indicated in Fig. 2 with the transverse score line above the roll 15, the lever 55 is swung to the left (Fig. 2), thus swinging the lever arms 9 downward and dropping the front end of the movable table, so that the glass cracks off above the roll 15. Both of the hand levers 55 and 58 are now moved to the left, so that the pairs of links 9 and 10 moving practically in parallelism carry the table still further downwardly and a considerable distance to the left, the glass at this time engaging the tops of the rolls 28 on the shafts 22 to 27, at which time the weight of the glass is transferred from the rolls 14 to the rolls 28. Assuming that the sheet is to be shifted to the cutting table 3, the lever 37 which controls the clutch member 36 is operated to throw in the drive in a direction such that the rolls 28 are rotated in a clockwise direction transferring the sheet to the roller top of the cutting table 3. The forward movement of the movable table as secured by the links 9 and 10 is advantageous as it carries the cut off section of glass out of the way of the forward end of the advancing ribbon. The movable table is now moved back into receiving position by swinging the levers 55 and 58 to the right, after which the cycle is repeated.

The glass upon the table 3 is trimmed and, if necessary cut into more than one section, after which the table is moved to the right on the track 9ª so that its end is in opposition to the end of the transfer table 8. This table is mounted upon the parallel links 59 and 60 carried by the shafts 61 and 62. Connected to one of the arms 60 is a connecting rod 63 pivoted at its lower end to the crank 64 carried by the shaft 65 and this shaft is rotated from a drive shaft 66 through the intermediary of a pinion 67 carried by the shaft 66 and a spur gear 68, carried by the shaft 65. In this manner, the table 8 may be swung from the position illustrated in Fig. 2 to a position to the right and above such position, so that its upper surface lies at the same level as the roller table 5. The table 8 is provided with rolls 69 upon which the glass rests and the ends of the shafts 70 which carry these rolls are provided with suitable sprockets driven from a sprocket chain 71. This chain is driven from a sprocket carried by the shaft 66, a suitable yielding chain tightener 72 being employed to take up the slack in the chain and keep it at the proper tension during the shifting movements of the table. The glass section is in this manner transferred to the top of the table 5 lying above the track 6 and from this point it may be transferred to one of the grinding tables or trucks located at one side of the track 6 and in parallelism therewith by means of the vacuum frame 8ª. The rollers 73 of the table 5 are driven by a sprocket chain 74 passing around sprocket wheels on the ends of the rollers and driven by a sprocket wheel on the shaft 66.

What I claim is:

1. Apparatus for cracking off and handling sections of a continuously formed horizontally moving glass ribbon, transversely scored to facilitate cracking off, comprising a table for receiving and supporting a glass section mounted for vertical movement so that it may be lowered below the level of the continuously formed ribbon causing the section upon the table to crack away from the ribbon and a secondary table below the level of the first table adapted to receive the cracked off section when the first table is lowered and provided with rolls mounted for rotation in planes at right angles to the line of movement of the ribbon.

2. Apparatus for cracking off and handling sections of a continuously formed horizontally moving glass ribbon, transversely scored to facilitate cracking off, comprising a table for receiving and supporting a glass section mounted for vertical movement so that it may be lowered below the level of the continuously formed ribbon causing the section upon the table to crack away from the ribbon, and a secondary table below the level of the first table adapted to receive the cracked off section when the first table is lowered and provided with driven rolls.

3. Apparatus for cracking off and handling sections of a continuously formed horizontally moving glass ribbon, transversely scored to facilitate cracking off, comprising a table for receiving and supporting a glass section mounted for vertical movement so that it may be lowered below the level of the continuously formed ribbon causing the section upon the table to crack away from the ribbon, a secondary table below the level of the first table adapted to receive the cracked off section from the first table when such table is lowered and provided with rolls mounted for rotation in planes at right angles to the line of movement of the ribbon, and a cutting table at the side of the secondary table having its top at the level of that of the secondary table.

4. Apparatus for cracking off and handling sections of a continuously formed horizontally moving glass ribbon, transversely scored to facilitate cracking off, comprising a table for receiving and supporting a glass section mounted for vertical movement so that it may be lowered below the level of the continuously formed ribbon causing the section upon the table to crack away from the ribbon, a secondary table below the level of the first table adapted to receive the cracked off section from the first table when such table is lowered and provided with rolls mounted for rotation in planes at right angles to the line of movement of the ribbon, and a pair of cutting tables at the sides of the secondary table having their tops at the level of that of the secondary table.

5. Apparatus for cracking off and handling sections of a continuously formed horizontally moving glass ribbon, transversely scored to facilitate cracking off, comprising a table for receiving and supporting a glass section mounted for vertical movement so that it may be lowered below the level of the continuously formed ribbon causing the section upon the table to crack away from the ribbon, a secondary table below the level of the first table adapted to receive the cracked off section from the first table when such table is lowered, rolls on the secondary table mounted for rotation in planes at right angles to the line of movement of the ribbon, driving means arranged to rotate the rolls in either direction, and a pair of cutting tables at the sides of the secondary table adapted to receive the glass sections moved laterally by the rolls.

6. Apparatus for cracking off and handling sections of a continuously formed horizontally moving glass ribbon transversely scored to facilitate cracking off, comprising a roller table for receiving and supporting the glass sections mounted for vertical movement and for movement longitudinally of the line of movement of the ribbon, means for moving the table, and a secondary roller table mounted below the level of the first table, and adapted to receive the cracked off sections from the first table when such first table is moved downwardly and forwardly, the rolls on the secondary table having their axes of rotation at right angles to those of the first table.

7. Apparatus for cracking off and handling sections of a continuously formed horizontally moving glass ribbon transversely scored to facilitate cracking off, comprising a roller table for receiving and supporting the glass sections mounted for vertical movement and for movement longitudinally of the line of movement of the ribbon, means for moving the table, and a secondary roller table mounted below the level of the first table, and adapted to receive the cracked off sections from the first table when such first table is moved downwardly and forwardly, the rolls on the secondary table being driven and having their axes of rotation at right angles to those of the first table.

8. Apparatus for cracking off and handling sections of a continuously formed horizontally moving glass ribbon transversely scored to facilitate cracking off, comprising a roller table for receiving and supporting the glass section mounted for vertical movement and for movement longitudinally of the line of movement of the ribbon, means for moving the table, and a secondary roller table mounted below the level of the first table and adapted to receive the cracked off sections from the first table when such table is moved downwardly and forwardly, and a cutting table at one side of the secondary table, the rolls of the secondary table being driven and having their axes of rotation at right angles to those of the first table.

9. Apparatus for cracking off and handling sections of a continuously formed horizontally moving glass ribbon transversely scored to facilitate cracking off, comprising a roller table for receiving and supporting the glass sections, means for supporting the table so that its forward end may be first tilted downward to crack the glass at the rear end of the table and the entire table then moved downwardly and forwardly, and a secondary roller table mounted below the level of the first table, and adapted to receive the cracked off sections from the first table when such first table is moved downwardly and forwardly, the rolls on the secondary table having their axes of rotation at right angles to those of the first table.

10. Apparatus for cracking off and handling sections of a continuously formed horizontally moving glass ribbon transversely scored to facilitate cracking off, comprising a roller table for receiving and supporting the glass sections, sets of supporting links for the table pivoted to its front and rear ends with the two sets in parallelism and inclined downwardly and rearwardly from the table, and independent operating means for swinging the two sets of links so that the table may be first tilted to crack off the section supported upon it and then moved bodily downwardly and forwardly, and a secondary roller table mounted below the level of the first table, and adapted to receive the cracked off sections from the first table when such first table is moved downwardly and forwardly, the rolls on the secondary table having their axes of rotation at right angles to those of the first table.

11. Apparatus for cracking off and handling sections of a continuously formed horizontally moving glass ribbon, transversely scored to facilitate cracking off, comprising a table for receiving and supporting a glass section mounted for vertical movement so that it may be lowered below the level of the continuously formed ribbon causing the section upon the table to crack away from the ribbon, a secondary table below the level of the first table adapted to receive the cracked off section when the first table is lowered and provided with rolls mounted for rotation in planes at right angles to the line of movement of the first table, a cutting table at the side of the secondary table in position to receive the section and mounted on wheels so that it may be moved laterally away from the secondary table, a receiving table at one side of the cutting table above the level thereof, and a transfer table, intermediate the cutting table and receiving table mounted for vertical movement so that in one position its top is on a level with that of the cutting table and in another position its top is on a level with that of the receiving table.

12. Apparatus for cracking off and handling sections of a continuously formed horizontally moving glass ribbon, transversely scored to facilitate cracking off, comprising a table for receiving and supporting a glass section mounted for vertical movement so that it may be lowered below the level of the continuously formed ribbon causing the section upon the table to crack away from the ribbon, a secondary table below the level of the first table adapted to receive the cracked off section when the first table is lowered and provided with rolls mounted for rotation in planes at right angles to the line of movement of the first table, a cutting table at the side of the secondary table in position to receive the section and mounted on wheels so that it may be moved laterally away from the secondary table, a receiving table at one side of the cutting table above the level thereof, a transfer table intermediate the cutting table and receiving table mounted for vertical movement and provided with continuously driven transfer rollers, and means for raising and lowering the transfer table at timed intervals.

In testimony whereof, I have hereunto subscribed my name this 16th day of March, 1925.

A. E. EVANS.